(12) United States Patent
Schiffman et al.

(10) Patent No.: US 11,144,621 B2
(45) Date of Patent: *Oct. 12, 2021

(54) AUTHENTICATION SYSTEM

(71) Applicant: Hewlett-Packard Development Company, L.P., Spring, TX (US)

(72) Inventors: Joshua Serratelli Schiffman, Bristol (GB); Gurchetan Grewal, Bristol (GB); Boris Balacheff, Meudon (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,198

(22) Filed: Dec. 13, 2019

(65) Prior Publication Data

US 2020/0117778 A1 Apr. 16, 2020

Related U.S. Application Data

(63) Continuation of application No. 15/795,601, filed on Oct. 27, 2017, now Pat. No. 10,540,487.

(30) Foreign Application Priority Data

Oct. 28, 2016 (EP) .................................... 16306428

(51) Int. Cl.
*H04L 9/00* (2006.01)
*G06F 21/31* (2013.01)
(Continued)

(52) U.S. Cl.
CPC .............. *G06F 21/31* (2013.01); *G06F 21/34* (2013.01); *H04L 9/085* (2013.01); *H04L 9/3213* (2013.01);
(Continued)

(58) Field of Classification Search
CPC ......... G06F 21/31; G06F 21/34; H04L 9/085; H04L 9/3213; H04L 63/0281; H04L 63/0884

See application file for complete search history.

(56) References Cited

U.S. PATENT DOCUMENTS 7,552,321 B2 6/2009 Rockwood et al.
8,510,811 B2 8/2013 Kuang et al.
(Continued)

FOREIGN PATENT DOCUMENTS

WO WO-0221766 3/2002

OTHER PUBLICATIONS

Privileged Identity Management with Ca Controlminder™, Jan. 15, 2010 < http://www.ca.com/in/~/media/Files/SolutionBriefs/ca-controlminder-solution-brief.PDF>.

*Primary Examiner* — Beemnet W Dada
(74) *Attorney, Agent, or Firm* — Austin Rapp

(57) ABSTRACT

A system and method for authentication are described herein. An authentication request is received at a combiner proxy (350). The combiner proxy (350), is arranged to receive a user authentication request, receive one or more share values from one or more communications devices (330A, . . . , 330N) where each of the communications devices (330A, . . . 330N) stores at least one share value of a set of share values and determine if one or more share values that have been received from the communications devices (330A, . . . , 330N) meet a quantitative criteria. The combiner proxy (350) is arranged to authenticate the user if the received share values meet the quantitative criteria.

15 Claims, 6 Drawing Sheets

(51) Int. Cl.
*H04L 29/06* (2006.01)
*H04L 9/08* (2006.01)
*G06F 21/34* (2013.01)
*H04L 9/32* (2006.01)

(52) U.S. Cl.
CPC ...... *H04L 63/0281* (2013.01); *H04L 63/0853* (2013.01); *H04L 63/0884* (2013.01)

(56) References Cited

U.S. PATENT DOCUMENTS

| | | |
|---|---|---|
| 9,374,369 B2 | 6/2016 | Mahaffey et al. |
| 10,540,487 B2 * | 1/2020 | Schiffman ............... G06F 21/31 |
| 2010/0280955 A1 | 11/2010 | Ross et al. |
| 2013/0291056 A1 | 10/2013 | Gaudet et al. |
| 2014/0189820 A1 | 7/2014 | Pieczul et al. |
| 2016/0112437 A1 | 4/2016 | Churyumov |
| 2016/0205089 A1 | 7/2016 | Ott et al. |
| 2016/0352732 A1 * | 12/2016 | Bamasag .............. H04L 9/3066 |
| 2017/0329944 A1 * | 11/2017 | Satyavarapu ........... H04L 63/10 |

* cited by examiner

AUTHENTICATION SYSTEM

RELATED APPLICATIONS

This application is a continuation of U.S. patent application Ser. No. 15/795,601 entitled "Authentication System," filed Oct. 27, 2017, which claims priority to European Patent Application No. 16306428.0 entitled "Authentication System," filed Oct. 28, 2016, which are all hereby incorporated by reference in their entirety.

BACKGROUND

Authentication is a process in which a user establishes their identity to gain access to a resource or system. Many commonplace authentication systems use password-based authentication. These systems rely on a user's ability to recall information only known to them. Other authentication systems make use of special purpose hardware such as smart cards or use special features of hardware such as gesture recognition. Password based authentication systems inconvenience users as they require users to remember password information. On the other hand, systems using special purpose hardware also inconvenience users as the hardware has to be carried and may be easily lost or stolen. Hence there is a need for an authentication system which allows a user to authenticate themselves without compromising security or which inconveniences the user.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
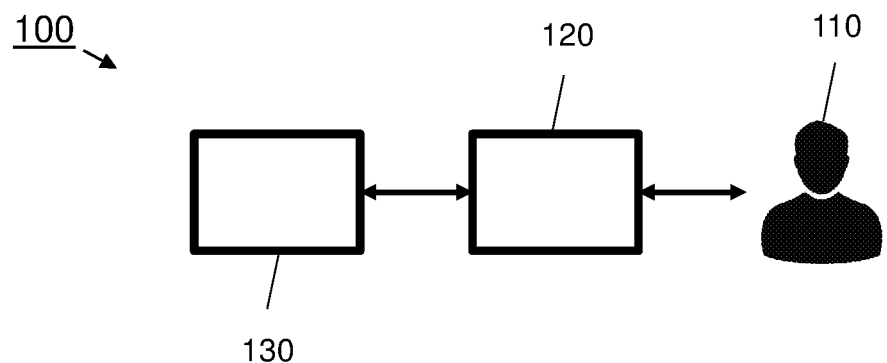
FIG. 1 is a schematic diagram of an apparatus for device registration according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Most personal computing systems feature some form of user authentication. User authentication is critical for protecting data and resources. Users of desktop computers will be familiar with password-based authentication. Similarly, most smart phone users will be familiar with gesture-based or Personal Identification Number (PIN) code-based authentication mechanisms, which are used to access smart phones. The need for authentication systems is ubiquitous and security engineers have designed a wide variety of different authentication mechanisms. However, it remains the case that many known authentication systems are cumbersome for users or compromise the users' security in favour of increased usability. For instance, password-based authentication systems often suffer from users choosing low entropy passwords. On the other hand, increasingly complex and convoluted requirements for passwords, which require users to include alphanumerical and special characters to increase password strength, can make them difficult to remember. This can lead to users forgetting passwords, reusing the same password across multiple accounts or leaving passwords in an unprotected file on a device.

As an alternative to password-based authentication, engineers have designed multi-factor authentication systems. In a multi-factor authentication system, a user presents two or more authentication credentials in an authentication protocol. In these protocols a user will typically have a number of "knowledge-based" factors, such as passwords or PIN codes, with "possession-factors", such as tokens and Radio Frequency Identification (RFID) cards. While multi-factor authentication can safely reduce the difficulty of managing individual authenticating factors, the complexity of using multiple credentials is cumbersome for users. For example, some systems make use of a token together with a password to authenticate a user. Such systems are in principle more secure than single password based authentication systems. However, a user has to remember to carry around the additional token to gain access to the system, causing the user inconvenience. Moreover, the token is easily lost or stolen.

Many authentication systems use cryptographic techniques to enhance security. A secret sharing scheme can be used to split a user credential into multiple "shares" that are distributed among multiple parties. Parties must co-operate as a group to reconstruct the secret. This cryptographic construction requires a user or users to possess shares from all of the parties to gain access to the secret. While this prevents an attacker from easily stealing a secret, theft or loss of one device effectively locks the user out of their account. In threshold secret sharing schemes, not all parties are required to co-operate in reconstructing a secret, whereby t-out-of-n (t<n) can perform the task.

Biometric authentication has been frequently used to overcome the drawbacks of password and token based authentication. The four main techniques using biometric attributes that are commonly used are finger print scans, iris scan, voice recognition, and facial recognition. For some users, such as physically impaired users, the use of biometrics may be challenging.

Designers of authentication systems have approached the problem of how to address the limited capacity users to remember passwords in a variety of ways. However, as described, many of these systems have flaws which weaken the security of the system to make the system more user-friendly or, alternatively, require users to carry special purpose or specially adapted hardware. Hence there is a need for a system which does not compromise security or require special purpose hardware and which is also user friendly.

The methods and systems described herein allow a user to authenticate themselves using communications devices, where the communications devices have storage for example for storing a user credential and associated data and are capable of returning the user credential and/or associated data in response to a valid challenge. A communications device may be any device satisfying these requirements and that may be closely associated with the user or some aspect of their identity. Examples include mobile phones, laptops, smart devices and items the user wears such as active badges or ID cards. The communications devices can be devices owned by the user or associated to the user. For example, a device may be owned by a company that the user works for but can be used to authenticate the user.

According to the present disclosure a user may wish to authenticate themselves with an authentication service to gain access to a target device or resource. In the present context an "authentication service" may be a service used to establish the identity of an authenticating client. The authentication service may be invoked by a target device that the user wants to access to verify the user's identity. Herein the "target device" may be a computing device, a service or a resource that the user wishes to login to and use. This may, for example, be a laptop, a desktop computer or an online service such as a website. The authentication service may notify the user of a successful authentication either directly or by using an authentication token. A first stage of an authentication protocol may be carried out by a "credential management system". The credential management system may be located on any device that is trusted to receive user credentials, such as one of the user's communications devices or a trusted third party. The credential management system may be arranged to establish connections to the user's communications devices, which have been registered for the purpose of authentication. In a first stage of the authentication protocol, the user may communicate a user credential to the credential management system. The credential management system may be arranged to generate and distribute "share values" of the user credential (or an associated secret authentication value) to each on the user's registered communications devices. In a second stage of the authentication protocol, the user may make an authentication request from a device or system under their control to a device or server herein referred to as a "combiner proxy". The combiner proxy may be arranged to determine if share values have been received from a subset of the registered devices at the time the authentication request is processed, where the subset of received share values satisfy a certain quantitative criteria. The combiner proxy may be arranged to recover the user credential from the received share values and communicate with the authentication service to authenticate the user (or otherwise), using the recovered user credential.

FIG. 1 illustrates a system 100 for device registration according to an example. In FIG. 1 a user 110 is shown in possession of a communications device 120. The communications device 120 may be a computing device with memory and a microprocessor or a device such a smart card or a token which comprises an electronic storage capability. The communications device 120 also has the capability to communicate with one or more other devices, for example, using a wireless communications protocol. For example, the communications device 120 may be arranged to implement one or more of Bluetooth, NFC or Wi-Fi to communicate with other devices. In FIG. 1, the communications device 120 is arranged to communicate with a credential management system 130. The credential management system 130 may be a computing device or server which is arranged to register communications devices, before an authentication protocol can be executed. A registration process may identify each device and the manner with which the device may be communicated with. The user 110 may assign an identifier, for example their name or an ID number, to their communications device 120. The user 110 and/or the credential management system 130 may also assign an identifier to a pairing between the communications device 120 and the credential management system 130 once a communications channel has been established. The user 110 repeats the process of device registration and pairing with the credential management system 130 for each of their communications devices that may be used in the authentication protocol.

Figure 2:
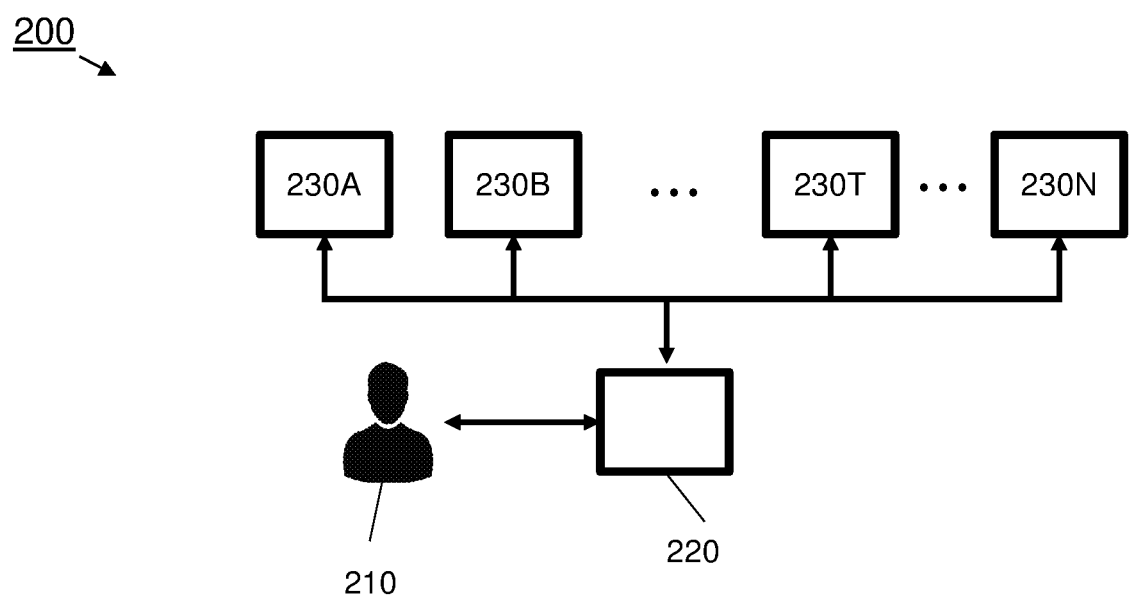
FIG. 2 is a schematic diagram of an apparatus for distributing share values according to an example.

FIG. 2 illustrates a system 200 for share distribution according to an example. In FIG. 2 a user is 210 is shown, together with a credential management system 220 and a number of communications devices 230A, . . . , 230N. In FIG. 2, each communications device 230A, . . . , 230N has been registered with the credential management system 220 and has the capability to establish a communications channel with the credential management system 220, for example, in the manner described in relation to the device 120 and credential management system 130 shown in FIG. 1. When the user 210 wishes to generate shares to be used for authentication, the user communicates a user credential to the credential management system 220, for example from a system or device, which may be one of their communications devices 230A, . . . , 230N. The credential management system 220 is arranged to provision share values to each registered communications device 230A, . . . , 230N. In particular, the credential management system is arranged to generate, for each of the plurality of devices 230A, . . . , 230N, at least one share value, which has been generated based on the user credential. The credential management system 230 uses the previously identified communications channels to distribute the at least one share value to each device 230A, . . . , 230N based on the identities of the pairings between the devices and the credential management system 220 that had been previously created.

Figure 3:
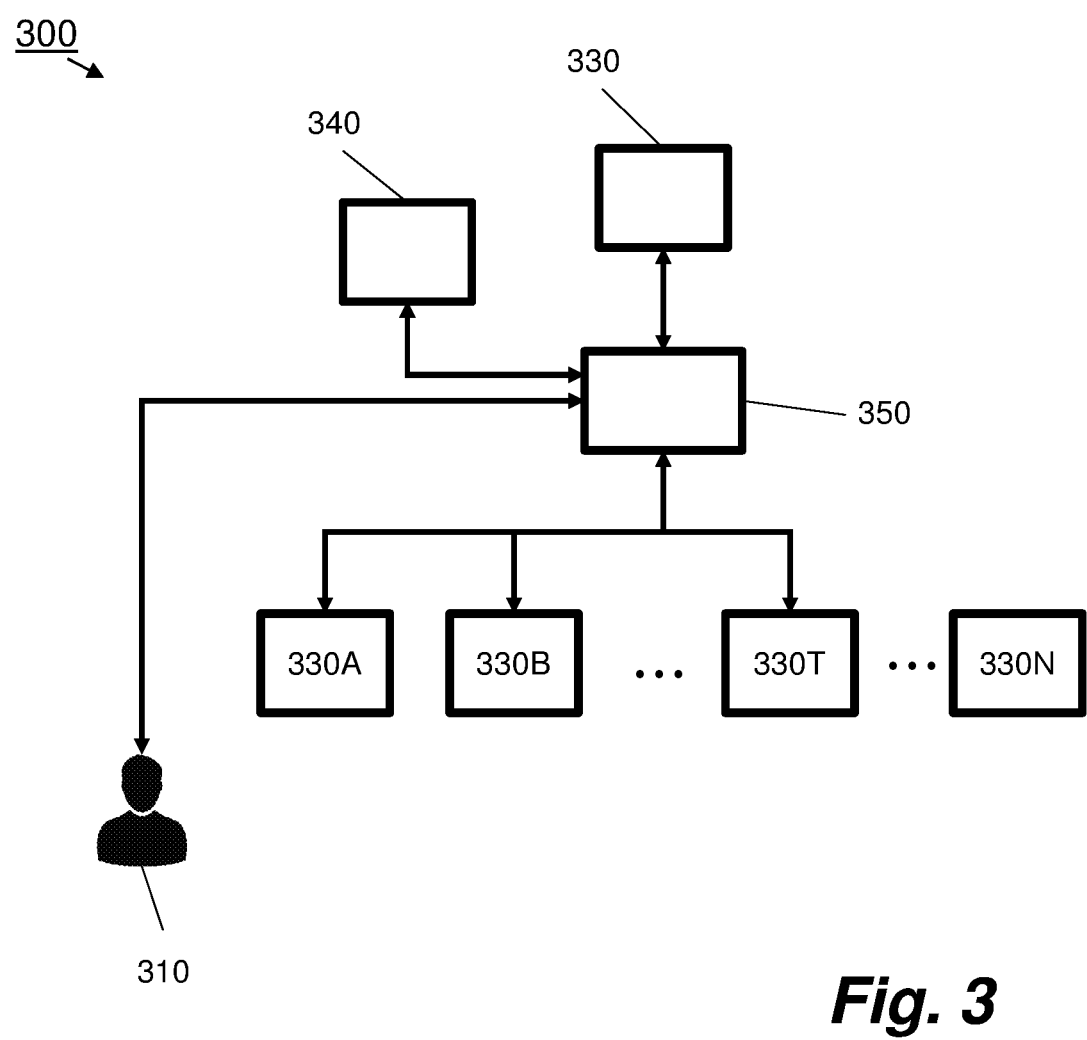
FIG. 3 is a schematic diagram of an apparatus for authenticating a user according to an example.

FIG. 3 illustrates a system for user authentication according to an example. In FIG. 3 a user 310 wishes to authenticate themselves to access a target device 320. The target device 320 may be any computing device, server or resource the user 310 wishes to access. The user 310 is in possession of at least a subset of communications devices 330A, . . . , 330N. Each of the devices 330A, . . . , 330N is arranged to store one or more share values received from a credential management system such as credential management system 220 shown in FIG. 2. Each one of the devices 330A, . . . , 330N has the capability of communicating with a combiner proxy 350. The combiner proxy 350 is a computing device or server which is in communication with an authentication service 340, the target device 320 and the user's devices 330A, . . . , 330N. The authentication service 340 may be a device such as a computing device or server or may be a network or web-based service. The authentication service 340 can be specified by the user 310 when they initially connect a communications device to the credential management system 220 shown in FIG. 2. The combiner proxy 350 executes the second stage of the authentication process between the authentication service 340 and the user's communications devices 330A, . . . , 330N. According to an example, the combiner proxy 350 executes on one of the user's devices 330A, . . . 330N. The user 310 may perform authentication with the authentication service 340 by using one of their devices to instruct the combiner proxy 350 to complete the authentication process.

According to an embodiment of the authentication apparatus 300 shown in FIG. 3, the communications devices 320A, . . . , 330N are arranged to communicate with the combiner proxy 350 to authenticate the user 310, for example, when the devices are in close proximity to the combiner proxy 350. This arrangement can be used to further enhance the security of the authentication apparatus by preventing remote man-in-the-middle style attacks that could be mounted from outside the vicinity of the user 310 and the combiner proxy 350. In another embodiment, the communications devices 330A, . . . , 330N can establish a secure channel with the combiner proxy and this can be established using a pairing process. For example, the user can introduce each of their devices to the combiner proxy to exchange cryptographic key material, which can be used to establish a secure channel.

The combiner proxy 350 may be arranged to determine if one or more share values distributed by the credential management system 220 and received from a subset 330A, . . . , 330T of the communications devices, 330A, . . . , 330N, meet a "quantitative criteria". According to an example, the quantitative criteria to be met is that the combiner proxy has received a threshold number of share values from the communications devices 330A, . . . , 330N. The threshold number may be fewer than the number of existing share values. In this example, once the combiner proxy 350 has received a sufficient number of share values from the subset of communications device 330A, . . . , 330N to recreate the user credential, the combiner proxy 350 can complete the authentication request from a device of the user 310 by communicating with the authentication service 340 that the quantitative criteria has been met.

Figure 4:
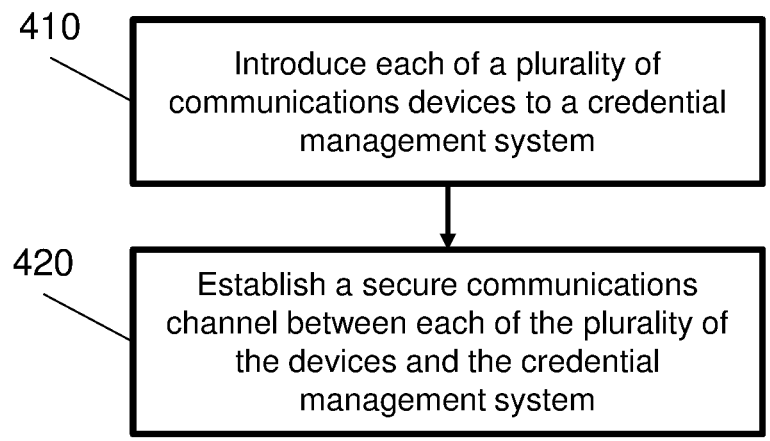
FIG. 4 is a flow diagram illustrating a method of registering a communications device according to an example.

FIG. 4 is a flow diagram showing a method 400 of registering communications devices according to an example. The method 400 may be implemented on the system 100 shown in FIG. 1. The method 400 can be carried out iteratively on a per-device basis for each device 230A, . . . , 230N shown in FIG. 2. At step 410 the user introduces each of their communications devices to a credential management system 130 prior to any authentication protocol taking place. In one case introducing a device to the credential management system involves bringing the device within proximity of the credential management system. Device registration with the credential management system 130 may happen at any time prior to a time when the user wishes to authenticate. Over time, new devices may be registered and old devices may be revoked from the credential management system 130, for example, via an appropriate user interface or management console.

At step 420 a secure communications channel is established between the device and the credential management system. For example, in one embodiment the credential management system 130 and communications device 110 exchange cryptographic keying material that may be used to establish an authenticated and encrypted communications channel. In such an implementation the communications device 110 has appropriate hardware and software capabilities to generate, or at least securely store, cryptographic keys and encrypt and authenticate data which is sent over the communications channel to the credential management system 130. In one case, the combiner proxy 350 may also be part of a registration process. For example, both the credential management system 130 and combiner proxy 350 may set up secure communications channels with the communications devices using the method described herein.

The process of establishment of secure communications channels with the credential management system 130 can happen in a number of different ways. For example, referring to FIG. 2, all of the communications devices 230A, . . . , 230N in the user's possession may possess a single shared secret. The single shared secret may be used to establish secret keys between pairs of devices, for example, by using the shared secret as a seed to generate secret keys. This arrangement may be advantageous where the credential management system 130 is one of the user's communications devices. In this case, the user can establish a shared secret between their devices before any user authentication takes place. An advantage of this arrangement is the simplicity of the set-up. However, in this case, it may be difficult to revoke an individual device if it is lost or stolen. Moreover, if the secret is compromised, it would have to be renewed on every device. In an alternative arrangement a different secret value may be stored on each communications device. This has the advantage that a device is easily revocable in the case that the device is compromised. However, generation of different secrets may be perceived to be onerous compared with use of one secret value for all devices. In a third arrangement, the communications devices may establish a public key infrastructure with the credential management system 130. With reference to FIG. 1, the device 110 generates a public/private key pair using a key generation algorithm. The device 110 sends the public key to the credential management system 130 over an insecure channel and retains the private key securely in storage. Similarly to the previous arrangement, this allows easy revocation of devices by, for example, revoking the public key on a device. However, this places an additional processing requirement on the user's devices to be able to generate and store public/private key pairs, which require more storage space than symmetric key-based systems. The approach to establishing secure communications channels may depend on a user's preferences (for example, ease of set-up and/or ease of device revocation) and on the processing capabilities of the plurality of communications devices. In some examples, trust in device identities may be increased by using a trusted authority to sign the public keys in a known way. In any case, once a secure communications channel between a communications device 110 and credential management system 130 has been established, the credential management system 130 may be arranged to send a message to the user 110 asking if they wish to trust the device 120. If the user 110 responds in the affirmative the pairing between the credential management system 130 and the device 110 is stored and assigned an identifier. The identifier may be any value which uniquely identifies the pairing amongst other pairings with other registered communications devices 230A, . . . , 230N as shown in FIG. 2.

Figure 5:
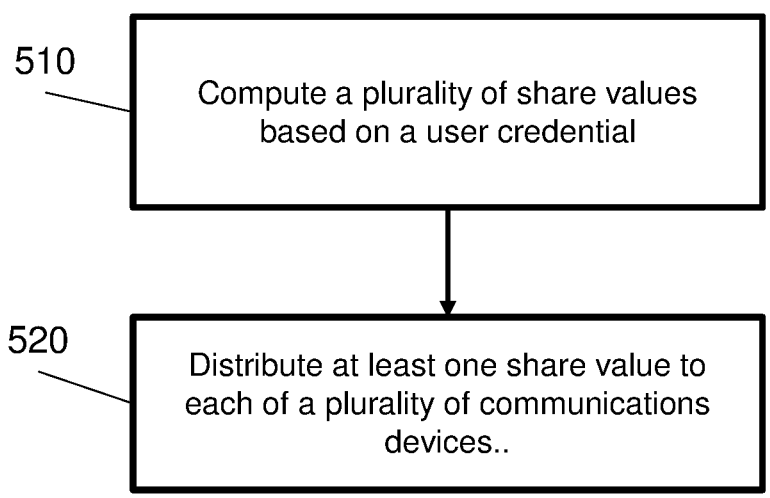
FIG. 5 is a flow diagram illustrating a method for distributing share values to a user according to an example.

FIG. 5 is a flow diagram showing a method 500 of share distribution according to an example. According to FIG. 5, the method 500 may be implemented on the system 200 shown in FIG. 2.

At step 510, a plurality of share values are computed by the credential management system 220 based on a user credential. The share values are computed such that any subset of share values meeting a quantitative criteria can be used to reconstruct the user credential. According to an example, a secret sharing scheme may be used for this purpose. A secret sharing scheme is a known mathematical construct which allows a secret value to be split into N share values in such a way that a subset of share values of a size exceeding a certain threshold can be used to reconstruct the secret value, but where any subset below the threshold reveals no information about the value. According to other examples, the credential management system 220 may be arranged to generate a secret authentication value in response to receipt of the authentication request and user credential from the user 210. According to this approach, the secret authentication value is used as a value to authenticate the user instead of the user credential. This alternative embodiment provides the user 210 with the ability to update their user credentials without the credential management system 220 having to re-compute and distribute a new set of shares. In any event, the share values are computed by the credential management system such that any subset of the share values which meet the quantitative criteria can authenticate the user.

At step 520 at least one share value is distributed to each of a plurality of communications devices. In one example, exactly one share value is distributed to each of the plurality of communications devices. However, in other schemes more than one share value may be distributed to one or more devices.

Figure 6:
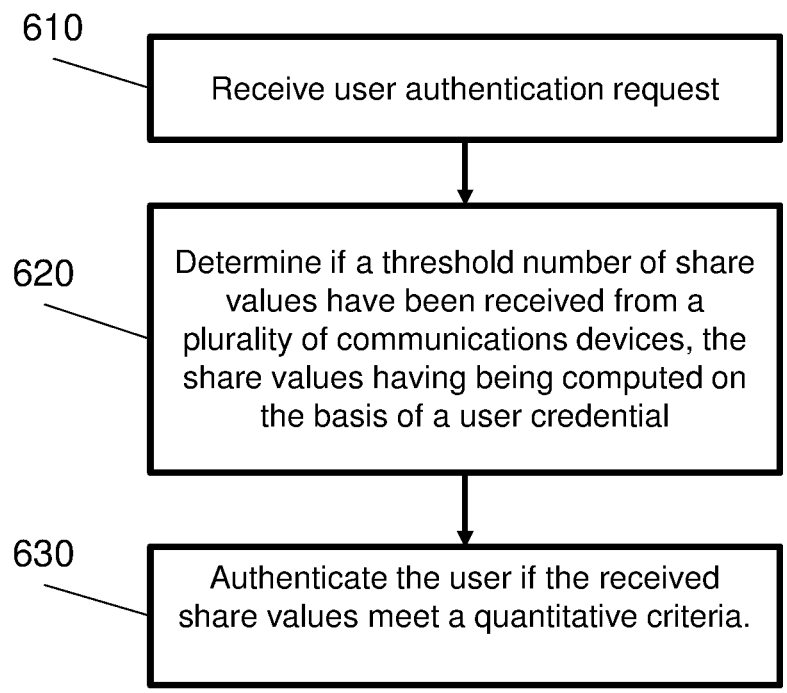
FIG. 6 is a flow diagram illustrating a method for user authentication according to an example.

The flow diagram in FIG. 6 illustrates a method 600 of authenticating a user according to an example. The method 600 may be implemented on the system 300 shown in FIG. 3. At block 610 a user authentication request is received from, for example, a device under the user's control. The authentication request comprises a request to authenticate the user using an authentication service, for example, the authentication service 340 shown in FIG. 3. A request to authenticate may be made in response to a prompt sent to the user, the prompt having been sent in response to an initial request by the user to access a target device or service, for example the target device 320 shown in FIG. 3. The target device is arranged to route the request to the authentication service which then communicates with the combiner proxy such as the combiner proxy 350 shown in FIG. 3. In some examples, the authentication service may be arranged to communicate with the user to indicate that they need to authenticate themselves with the authentication service, in advance of communicating with the combiner proxy. In this event, the user may have the opportunity to switch on or activate certain communications devices that are needed to provide authentication, provide permission to continue or even abort the process. In other examples, the authentication service may communicate with the combiner proxy without notifying the user.

At block 620 a determination of whether one or more share values received from a subset of a plurality of communications devices meet a quantitative criteria is made, where the share values have been computed on the basis of a user credential of the user. When the method 600 is implemented on the system shown in FIG. 3, a subset of the communications devices 330A, . . . , 330N are arranged to send share values to the combiner proxy. The combiner proxy 350 is arranged to determine if one or more share values have been received from a subset of the plurality of communications devices 330A, . . . , 330N. The combiner proxy 350 determines if a subset of share values which meet a quantitative criteria have been received. In one example, the quantitative criteria can be a threshold number of share values. In the example shown in FIG. 3, a subset of T out of N communications devices 330A, . . . , 330T provide share values to the combiner proxy 350. When such a subset has been received the combiner proxy 350 is arranged to communicate with the authentication service 340 to authenticate the user 310 to allow them access to the target device 320. According to other examples, a quantitative criteria may be a criteria specifying that a number of share values have been received in a certain time frame or that a subset of the communications devices 330A, . . . , 330N that registered earliest with the credential management system 220 have sent shares to the combiner proxy 350.

According to an example, the combiner proxy 350 is arranged to recover the user credential of the user 310 based on an aggregation share values. The process of aggregation of share values depends on the scheme employed by the credential management system to distribute shares. If the credential management system 320 uses a secret sharing scheme the aggregation of shares comprises executing a mathematical algorithm to recover the secret value (the user credential or related value). According to an example, the combiner proxy 350 can use the recovered user credential to obtain an authentication token from the authentication service 340. The authentication token is then used to authenticate the user. According to another example, rather than an authentication token, the user is granted access without explicitly receiving an authentication token via e.g. a webpage.

In one case, the combiner proxy 350 is operable on one of the user's communications devices 330A, . . . , 330N which is arranged to communicate directly with the target device 320 and authentication service 340. In this case, the combiner proxy 350 must be trusted to discard the user credential which will be used to authenticate the user 310. If the user credential was not discarded the user 310 could potentially re-use their previous reconstructed user credential in a second authentication session to access a target device without possessing shares from a plurality of devices meeting the quantitative criteria—this would present a security threat if e.g. one of the user's devices were stolen. According to another embodiment the combiner proxy is arranged to reconstruct a secret authentication value as opposed to the user credential. As described in relation to FIG. 2, where the credential management system 220 generates share values based on a secret authentication value and distributes the share values to the plurality of communications devices, the combiner proxy 350 can recover such a secret authentication value from share values received from a subset of the communications devices 330A, . . . , 330N that meet the quantitative criteria according to the authentication protocol. In a further example, the combiner proxy 350 may be arranged to act as an authentication service itself. This arrangement may advantageously be deployed where the target device 320 is physically located in the same area as the user.

At block 630, the user is authenticated if the received values meet the quantitative criteria. When the share values meet the quantitative criteria, the combiner proxy 350 is arranged to recover the user credential or secret authentication value. The combiner proxy 350 communicates the recovered user credential to the authentication service 340. The combiner proxy obtains an authentication token from the authentication service 340 using the user credential. The authentication token is used authenticates the user.

Figure 7:
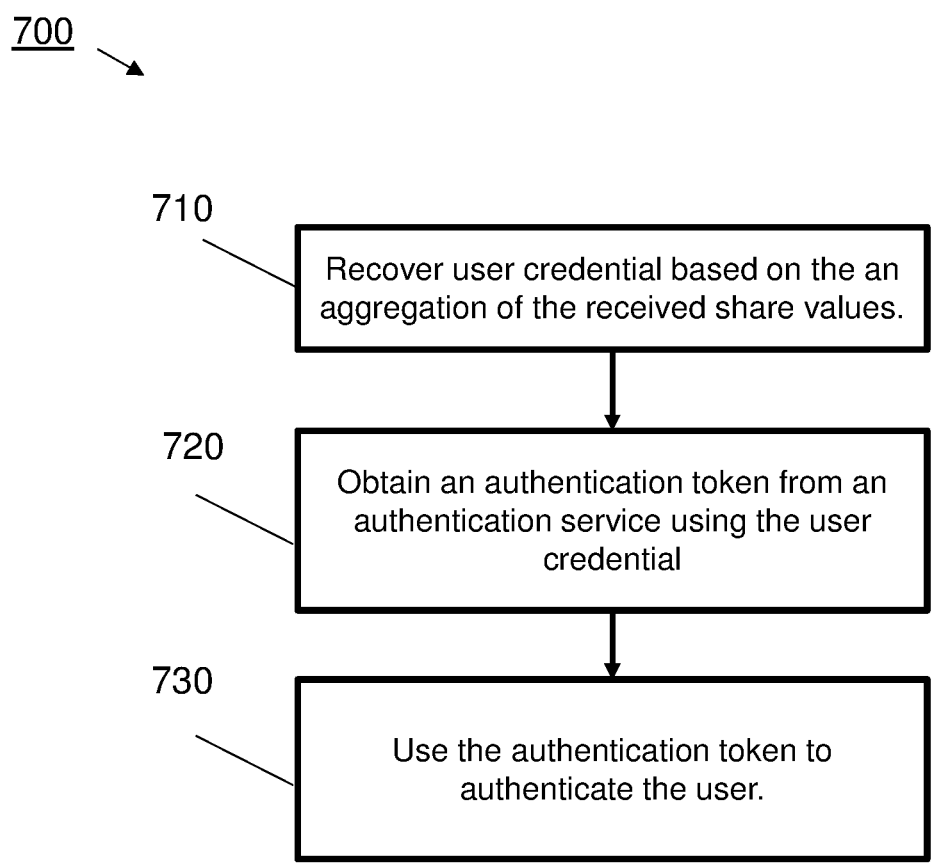
FIG. 7 is a flow diagram illustrating a method for user authentication according to an example.

FIG. 7 is a flow diagram showing a method 700 for authenticating a user according to an example. The method 700 may be implemented on a system such as system 300 shown in FIG. 3. The method 700 may be used in conjunction with the method 700 shown in FIG. 6. According to an example, the share values are received at a combiner proxy such as combiner proxy 350 shown in FIG. 3. At step 710, a user credential is recovered based on an aggregation of the received share values share values. The share aggregation is carried out following a determination that a quantitative criteria has been met for share values received from a plurality of communications devices of a user, as described in relation to step 620 shown in FIG. 6. The share values are aggregated based on the method of share distribution which has been employed by the system 200. For example, if the credential management system 220 uses a secret sharing scheme to generate share values of a user credential, then the process of aggregation is based on interpolation of a subset of share values where the number of share values received from the plurality of communications devices exceeds a certain threshold. According to an example, where the user credential itself is used to generate share values, the recovery process outputs the user credential. According to another example, the user credential may be identifiable from a secret authentication value which was used to generate share values. Recovery of the user credential in this case is based on the reconstruction of the secret authentication value from the one or more share values which meet the quantitative criteria. The user credential may be stored by the combiner proxy and released upon determination that the aggregation of the received share values is equal to the secret authentication value. According to another example, the user credential may be encrypted using a secret key and stored with the combiner proxy. In such a case, the secret key may be shared amongst the communications devices. In this example, the communications channels between the combiner proxy and the communications devices is not necessarily secure. For authentication, both the secret key and the encrypted user credential are required. An adversary may learn the key but they are not able to get the encrypted user credential that is stored with the combiner proxy in this case. Both the secret key and the user credential are required for authentication. However, some attacks may still be possible because in the case that the communications channel is insecure channel. Notably, a denial-of-service attack, where an adversary could prevent a legitimate user from being able to authenticate, may take advantage of the insecure channel.

At step 720, an authentication token is obtained from an authentication service using the user credential recovered at step 710. In some embodiments the authentication token may be a confirmation that the user is authorised to access the target device. In other case, the token may be a number or combination of alphanumerical and/or other characters, which the user can input to obtain authorization to access a target. At step 730 the authentication token is used to authenticate the user The methods and systems described herein provide a means for a user to authenticate themselves to access a target device or resource. The methods described allow the user to use their communications devices such as their smart phone or laptop to authenticate themselves. Prior approaches to the problem of user authentication require the user to either remember passwords or carry specially adapted or special purpose hardware. The methods and systems described herein avoid the problems of previous systems because the secret information required to authenticate (the user credential or secret authentication value) is distributed amongst the user's devices which are already in their possession. The secret information can be reconstructed at the time of authentication from a subset of the user's devices. Even if a device is stolen by an attacker, this does not give the attacker the ability to access the user's accounts as they do not possess sufficient information to pass the quantitative criteria necessary to access the user's accounts. Advantageously, the methods described do not require the user to carry special purpose hardware. Moreover, these methods can easily be applied to existing authentication systems with minimal modifications.

Figure 8:
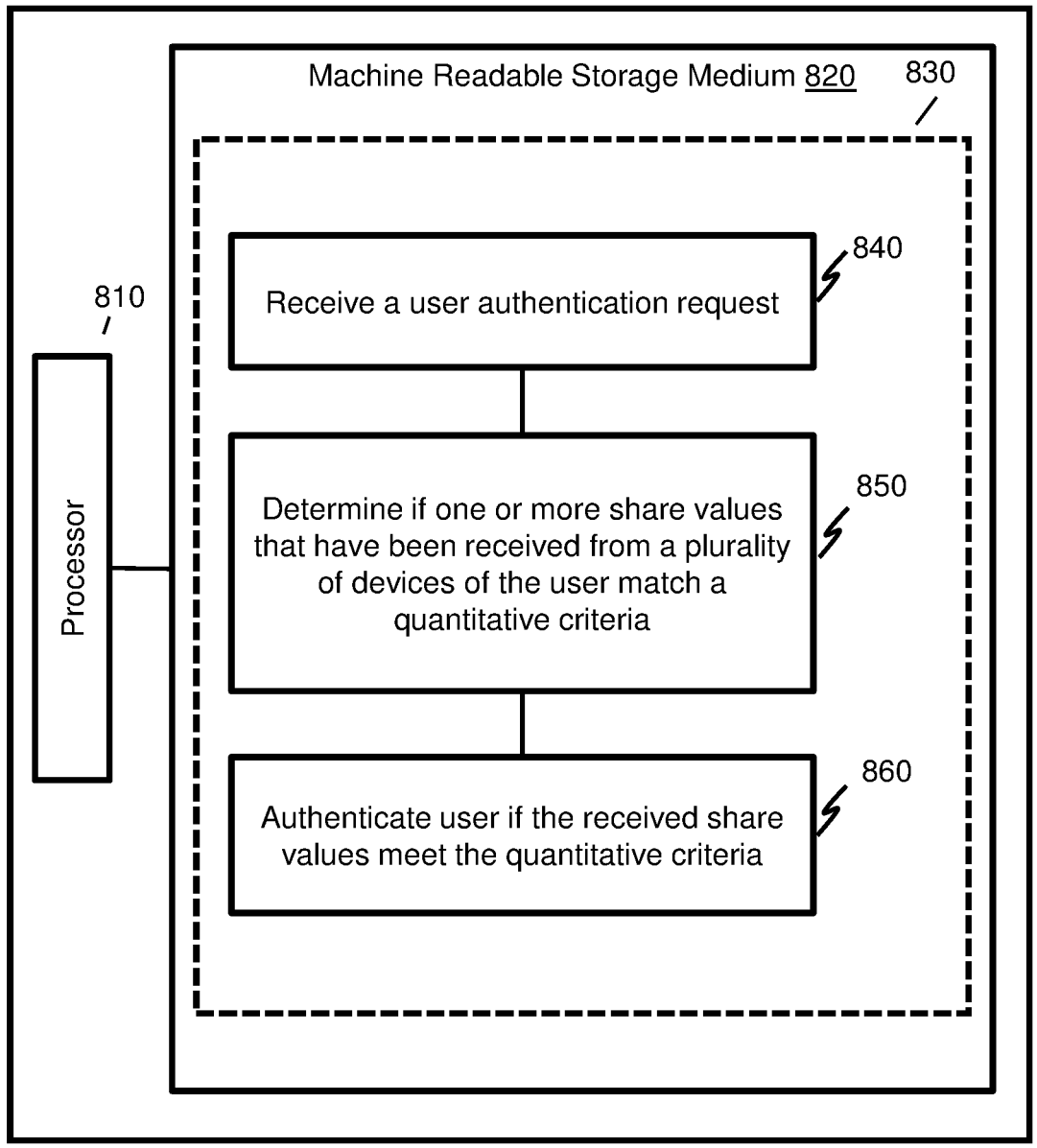
FIG. 8 is a block diagram of a computer system according to an example.

Certain methods and systems as described herein may be implemented by one or more processors that process program code that is retrieved from a non-transitory storage medium. FIG. 8 shows an example 800 of a device comprising at least one processor 810 coupled to machine-readable storage medium 820. Machine-readable media 820 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In FIG. 8, the machine-readable storage medium comprises program code to authenticate a user as described in the foregoing examples herein. In particular the machine-readable storage medium 820 comprises program code 830 which causes one or more processors to: receive a user authentication request 840; determine if one or more share values that have been received from a plurality of communications devices match a quantitative criteria 850 and authenticate the user if the received share values meet the quantitative criteria 860.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

The invention claimed is:

1. A method of authenticating a user comprising:
receiving a user authentication request;
determining if a share value that has been received from a plurality of communications devices meets a quantitative criteria, each of the communications devices storing at least one share value of a set of share values distributed among the plurality of communications devices, the share values having being computed on the basis of a user credential, wherein determining if the quantitative criteria has been met comprises determining if the number of share values received from the plurality of communications devices have been received in a specified time frame; and
authenticating the user if the received share values meet the quantitative criteria.

2. The method of claim 1 wherein authenticating the user comprises:
recovering the user credential based on an aggregation of the received share values;
obtaining an authentication token from an authentication service using the user credential; and
using the authentication token to authenticate the user.

3. The method of claim 2 wherein recovering the user credential comprises:
determining if the aggregation of received share values is equal to a secret authentication value; and
releasing the user credential if it is determined that the aggregation of received share values is equal to the secret authentication value.

4. The method of claim 1 wherein determining if the quantitative criteria has been met further comprises determining if the number of received share values meets or exceeds a threshold number.

5. A method comprising:
computing a plurality of share values based on a user credential, the plurality of share values being such that any subset thereof meeting a quantitative criteria can be used to authenticate the user, wherein meeting the quantitative criteria comprises determining if the number of share values received from a plurality of communications devices have been received in a specified time frame; and distributing at least one share value to each of the plurality of communications devices.

6. The method of claim 5 comprising:
registering each of the plurality of communications devices with a credential management system.

7. The method of claim 5 wherein computing a plurality of share values based on a user credential comprises:
generating a secret authentication value in response to receipt of the user credential; and
generating the share values using the secret authentication value.

8. The method of claim 5 wherein the share values comprise a share of the user credential.

9. A system comprising:
a combiner proxy arranged to:
receive a user authentication request;
receive a share value from a communications device, the communications device storing at least one share value of a set of share values distributed among a plurality of communications devices, the share values having been computed on the basis of a user credential;
determine if the share value that has been received meets a quantitative criteria, wherein determining if the quantitative criteria has been met comprises determining if the number of share values received from the plurality of communications devices have been received in a specified time frame; and
authenticate the user if the received shared share values meet the quantitative criteria.

10. The system of claim 9 wherein to authenticate the user the combiner proxy is arranged to:
recover the user credential based on an aggregation of the received share values;
obtain an authentication token from the authentication device using the user credential; and
use the authentication token to authenticate the user.

11. The system of claim 9 wherein the combiner proxy is operable on a device of the plurality of communications devices.

12. The system of claim 9 further comprising a credential management system arranged to:
compute a plurality of share values being such that any subset thereof meeting the quantitative criteria can be used to authenticate the user; and
distribute at least one share value to each of the plurality of communications devices.

13. The system of claim 12 wherein the credential management system is arranged to:
generate a secret authentication value in response to receipt of the user credential; and
generate the share value from the secret authentication value.

14. The system of claim 12 wherein the credential management system is operable on a device of the plurality of communications devices.

15. A non-transitory computer-readable storage medium storing instructions that, when executed by one or more processors, cause the one or more processors to:
receive a user authentication request;
determine if a share value that has been received from a plurality of communications devices meets a quantitative criteria, each of the communications devices storing at least one share value of a set of share values distributed among the plurality of communications devices, the share values having being computed on the basis of a user credential, wherein determining if the quantitative criteria has been met comprises determining if the number of share values received from the plurality of communications devices have been received in a specified time frame; and
authenticate the user if the received share value meets the quantitative criteria.

* * * * *